(12) United States Patent
Cowen

(10) Patent No.: US 9,098,851 B2
(45) Date of Patent: Aug. 4, 2015

(54) METHOD AND APPARATUS FOR SIMPLIFYING THE HANDLING OF COMPLEX PAYMENT TRANSACTIONS

(75) Inventor: Michael J. Cowen, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 12/368,394

(22) Filed: Feb. 10, 2009

(65) Prior Publication Data
US 2009/0210299 A1 Aug. 20, 2009

Related U.S. Application Data

(60) Provisional application No. 61/028,544, filed on Feb. 14, 2008.

(51) Int. Cl.
G06Q 20/40 (2012.01)
G06Q 20/10 (2012.01)
G06Q 20/20 (2012.01)
G06Q 30/02 (2012.01)

(52) U.S. Cl.
CPC ............ *G06Q 20/4037* (2013.01); *G06Q 20/10* (2013.01); *G06Q 20/204* (2013.01); *G06Q 30/0284* (2013.01)

(58) Field of Classification Search
CPC ....... G07B 15/02; G07B 15/00; G06Q 20/145
See application file for complete search history.

(56) References Cited

U.S. PATENT DOCUMENTS

| 4,114,027 A | 9/1978 | Slater et al. |
|---|---|---|
| 4,630,201 A | 12/1986 | White |
| 4,634,147 A | 1/1987 | McClure |
| 4,804,825 A | 2/1989 | Bitoh |
| 4,849,613 A | 7/1989 | Eisele |
| 4,891,503 A | 1/1990 | Jewell et al. |
| 5,055,657 A | 10/1991 | Miller et al. |
| 5,285,382 A | 2/1994 | Muehlberger et al. |

(Continued)

FOREIGN PATENT DOCUMENTS

| EP | 0 949 593 | 3/1999 |
|---|---|---|
| EP | 0945833 A2 | 9/1999 |

(Continued)

OTHER PUBLICATIONS

Toronto Transit Commission, TTC Fare Collection study, Oct. 2000, Toronto Transit Commission, p. 1-95, http://transit.toronto.on.ca/archives/reports/fare.pdf, retrieved Sep. 14, 2010.*

(Continued)

*Primary Examiner* — George Chen
(74) *Attorney, Agent, or Firm* — Otterstedt, Ellenbogen & Kammer, LLP

(57) ABSTRACT

A predetermined amount, which may, in general, be zero, less than, the same as, or greater than a (yet-to-be-determined) final transaction amount, is charged upon first presentation of a payment device to a merchant. A final transaction amount is calculated, preferably at a central server, subsequent to the first presentation. A variable adjustment value is calculated, preferably at the central server, by comparing the predetermined amount already charged with the final transaction amount. A new predetermined amount charged, upon a subsequent presentation of the payment device, is modified by the variable adjustment value.

17 Claims, 6 Drawing Sheets

(56) References Cited

U.S. PATENT DOCUMENTS

| | | | |
|---|---|---|---|
| 5,384,449 A | 1/1995 | Peirce | |
| 5,485,510 A | 1/1996 | Colbert | |
| 5,650,606 A | 7/1997 | Baus, Jr. | |
| 5,679,938 A | 10/1997 | Templeton et al. | |
| 5,744,787 A | 4/1998 | Teicher | |
| 5,793,027 A | 8/1998 | Baik | |
| 5,828,044 A | 10/1998 | Jun et al. | |
| 5,917,913 A | 6/1999 | Wang | |
| 5,999,919 A | 12/1999 | Jarecki et al. | |
| 6,018,717 A | 1/2000 | Lee et al. | |
| 6,023,682 A | 2/2000 | Checchio | |
| 6,038,552 A | 3/2000 | Fleischl et al. | |
| 6,064,988 A | 5/2000 | Thomas | |
| 6,070,795 A | 6/2000 | Feiken | |
| 6,078,888 A | 6/2000 | Johnson, Jr. | |
| 6,123,223 A | 9/2000 | Watkins | |
| 6,182,894 B1 | 2/2001 | Hackett et al. | |
| 6,422,460 B1 | 7/2002 | Boesch | |
| 6,546,373 B1 | 4/2003 | Cerra | |
| 6,554,183 B1 | 4/2003 | Sticha et al. | |
| 6,651,885 B1 | 11/2003 | Arias | |
| 6,675,153 B1 | 1/2004 | Cook et al. | |
| 6,749,114 B2 | 6/2004 | Madani | |
| 6,786,402 B2 * | 9/2004 | Harris | 235/382 |
| 6,848,613 B2 | 2/2005 | Nielsen et al. | |
| 6,850,916 B1 | 2/2005 | Wang | |
| 6,853,987 B1 | 2/2005 | Cook | |
| 6,923,371 B2 | 8/2005 | Goodfellow | |
| 6,931,382 B2 | 8/2005 | Laage et al. | |
| 6,934,849 B2 | 8/2005 | Kramer et al. | |
| 6,999,944 B1 | 2/2006 | Cook | |
| 7,003,495 B1 | 2/2006 | Burger et al. | |
| 7,010,512 B1 | 3/2006 | Gillin et al. | |
| 7,021,532 B2 | 4/2006 | Robinson et al. | |
| 7,039,611 B2 | 5/2006 | Devine | |
| 7,124,118 B2 * | 10/2006 | Andrews | 705/417 |
| 2001/0029494 A1 | 10/2001 | Tomita | |
| 2002/0032661 A1 | 3/2002 | Schuba et al. | |
| 2002/0046092 A1 | 4/2002 | Ostroff | |
| 2002/0074401 A1 | 6/2002 | Madani | |
| 2002/0124184 A1 | 9/2002 | Fichadia et al. | |
| 2002/0138445 A1 | 9/2002 | Laage et al. | |
| 2002/0156745 A1 | 10/2002 | Tallent et al. | |
| 2002/0170959 A1 | 11/2002 | Madani | |
| 2003/0053609 A1 | 3/2003 | Risafi et al. | |
| 2003/0055786 A1 | 3/2003 | Smith, Jr. et al. | |
| 2003/0061153 A1 | 3/2003 | Birdsong et al. | |
| 2003/0061163 A1 | 3/2003 | Durfield | |
| 2003/0074317 A1 | 4/2003 | Hofi | |
| 2003/0080186 A1 | 5/2003 | McDonald et al. | |
| 2003/0097402 A1 | 5/2003 | Vindeby | |
| 2003/0101137 A1 | 5/2003 | Wronski | |
| 2003/0140007 A1 | 7/2003 | Kramer et al. | |
| 2003/0163424 A1 | 8/2003 | Kumamoto | |
| 2003/0212796 A1 | 11/2003 | Willard | |
| 2003/0236755 A1 | 12/2003 | Dagelet, Jr. | |
| 2004/0006536 A1 | 1/2004 | Kawashima et al. | |
| 2004/0039694 A1 | 2/2004 | Dunn et al. | |
| 2004/0128258 A1 | 7/2004 | Su | |
| 2004/0230535 A1 | 11/2004 | Binder et al. | |
| 2004/0238620 A1 | 12/2004 | Cohagan et al. | |
| 2004/0243510 A1 | 12/2004 | Hinderer et al. | |
| 2005/0044039 A1 | 2/2005 | Greer et al. | |
| 2005/0116026 A1 | 6/2005 | Burger et al. | |
| 2005/0131826 A1 | 6/2005 | Cook | |
| 2005/0149455 A1 | 7/2005 | Bruesewitz et al. | |
| 2005/0184145 A1 | 8/2005 | Law et al. | |
| 2005/0238149 A1 | 10/2005 | DeLeon | |
| 2005/0262026 A1 | 11/2005 | Watkins | |
| 2005/0269398 A1 | 12/2005 | Robinson et al. | |
| 2006/0031161 A1 | 2/2006 | D'Agostino | |
| 2007/0130087 A1 | 6/2007 | Adamson | |
| 2007/0131761 A1 | 6/2007 | Smets et al. | |
| 2007/0168260 A1 | 7/2007 | Cunescu et al. | |
| 2007/0215697 A1 | 9/2007 | Ward et al. | |
| 2007/0262139 A1 | 11/2007 | Fiebiger et al. | |
| 2007/0271179 A1 | 11/2007 | Kubota | |
| 2008/0033880 A1 | 2/2008 | Fiebiger et al. | |
| 2008/0156873 A1 | 7/2008 | Wilhelm et al. | |
| 2010/0312617 A1 | 12/2010 | Cowen | |

FOREIGN PATENT DOCUMENTS

| | | |
|---|---|---|
| JP | 54149444 | 11/1979 |
| WO | WO 02084569 A1 | 10/2002 |
| WO | WO 2006/124808 A2 | 11/2006 |
| WO | WO 2006/124808 A3 | 11/2006 |

OTHER PUBLICATIONS

Transport for London, London, England, Get the most from Oyster, A user's guide, Jan. 2009, pp. 1-11.

EMV Integrated Circuit Card, Specifications for Payment Systems, Book 3, Application Specification, Version 4.2, Jun. 2008, EMVCO, LLC, Foster City, CA pp. i-xiv.

EMV Integrated Circuit Card, Specifications for Payment Systems, Book 4, Cardholder, Attendant, and Acquirer Interface Requirements, Version 4.2 Jun. 2008, EMVCO, LLC, Foster City, CA pp. i-xii, 106-107.

Klaus Finkenzeller, Fundamental Operating Principles, from RFID Handbook: Fundamentals and Applications in Contactless Smart Cards and Identification, copyright 2003 John Wiley & Sons Ltd ISBN: 0-470-84402-7.

Understanding the Requirements of ISO/IEC 14443 for Type B Proximity Contactless Identification Cards, ATMEL publication, Rev. 2056A-RFID—Aug. 2002.

Identification Cards—Contactless Integrated Circuit(s) Cards—Proximity Cards, from International Standard copyright ISO/IEC FCD 14443-1 ISO/IEC JTC1/SC17 N 1363. Final Committee Draft Part 1: Physical Characteristics.

Cutting EdgeTechnology for ePurse Cards, downloaded from http://www.gi-de.com/portal/page?_pageid=42,54782&_dad=portal&_schema=PORTAL, Aug. 24, 2005.

Star Debit/Credit—The Secure Solution for your Chip Migration, downloaded from http://www.gi-de.com/portal/page?_pageid=42,54776&_dad=portal&_schema=PORTAL, Aug. 24, 2005.

Octopus Cards Limited, Hong Kong, S.A.R., P.R. China, Octopus—Consumer—AAVS, Reload your Octopus, http://www.octopuscards.com/consumer/payment/reload/en/aays.jsp, Jul. 29, 2009, pp. 1-2.

* cited by examiner

METHOD AND APPARATUS FOR SIMPLIFYING THE HANDLING OF COMPLEX PAYMENT TRANSACTIONS

CROSS-REFERENCE TO RELATED APPLICATIONS

This patent application claims the benefit of U.S. Provisional Patent Application Ser. No. 61/028,544 of inventor Michael J. Cowen, filed Feb. 14, 2008, and entitled "Method and Apparatus for Simplifying The Handling Of Complex Payment Transactions." The complete disclosure of the aforementioned Provisional Patent Application Ser. No. 61/028,544 is expressly incorporated herein by reference in its entirety for all purposes.

FIELD OF THE INVENTION

The present invention relates generally to electronic commerce, and, more particularly, to electronic payment systems.

BACKGROUND OF THE INVENTION

There is an interest in employing cash alternatives in a variety of environments. Such cash alternatives can include, for example, payment devices such as payment cards and the like. In some cases, it may be difficult to employ such cash alternatives where transaction processing times are too long, for example, due to slow terminal decisioning. One non-limiting example of a situation where transaction times might need to be short is the case of high volume environments (for example, access to transit systems). Such high volume environments might also tend to involve relatively low-value transactions. The use of offline techniques such as that described by the EMV specifications for chip-based payment transactions (discussed below) show how to conduct offline transactions efficiently and quickly, but not all transactions can be handled offline and not 100% of the time as card risk management will periodically require communication with the issuer.

In addition, there is an interest in employing payment cards or other payment devices for complex transactions, where the final transaction amount may not be known upon initial presentation of the payment card or other payment device. Non-limiting examples of this include transit fares where the fare depends on the entrance and exit locations, or upon a discount requiring some type of calculation. Another non-limiting example is health insurance or the like where the patient-responsible amount is not known when the patient initially presents his or her card or device, but is only determined at a later time, after adjudication by an insurance carrier or the like.

SUMMARY OF THE INVENTION

Principles of the present invention provide techniques for simplifying the handling of complex payment transactions. An exemplary embodiment of a method (which can be computer-implemented), according to one aspect of the invention, includes the steps of charging a predetermined amount, which may, in general, be zero, less than, the same as, or greater than a (yet-to-be-determined) final transaction amount, upon the first presentation of the device to the merchant; calculating the final transaction amount, subsequent to the first presentation; calculating a variable adjustment value by comparing the predetermined amount already charged with the final transaction amount; and modifying a new predetermined amount charged, upon a subsequent presentation of the payment device, by the variable adjustment value. The final transaction amount and the variable adjustment value are preferably calculated by a central server (or at least made available to such a server). As used herein, "first presentation" includes both (i) the first-ever presentation of the device to the merchant, and (ii) in the case of a device that has previously been presented to the merchant, the first presentation of a series of presentations.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (ii) a combination of hardware and software modules; any of (i)-(iii) implement the specific techniques set forth herein, and the software modules are stored in a tangible computer-readable storage medium (or multiple such media).

One or more embodiments of the invention can provide substantial beneficial technical effects; for example, in transit systems with payment dependent on entrance and exit locations, substantially reducing the processing requirement at the exit gate, thereby greatly reducing the complexity of equipment required at the gate.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the invention provide a method for simplifying the handling of complex payment transactions in which the final transaction amount is not known when the card or other payment device is first presented. An example of such a transaction is a distance-based "check-in/check-out" transit fare payment.

Using transit as a non-limiting example, one or more embodiments of the invention provide a method whereby no special (transit-related) data needs to be retrieved and no high speed calculations need to be performed as the card exits the transit system. Instead, the complex fare amount calculation is performed at a central server after the card has left the transit system, and the outcome applied to an 'adjustment' value which is maintained centrally for each card or other payment token. The adjustment amount is then applied to the transaction amount the next time the card enters the transit system. A further benefit of this exemplary method is that it obviates the need to make an offline refund to an on-card balance—an operation which is not possible for certain card types, for example, those based on the EMV specifications for chip-based card payments (discussed below).

The effect of one or more embodiments of this invention on a transit fare collection scheme is to move from a variable fare model (with real-time fare calculation at exit) to a fixed fare model with a variable adjustment (usually a rebate), calculated centrally following exit and applied to a subsequent transaction. This in turn allows for centralization of complex fare calculations and greatly reduces the processing requirements at the exit gate, thereby greatly reducing the complexity of equipment required at the gate (potentially to little more than a 'dumb' reader).

Figure 1:
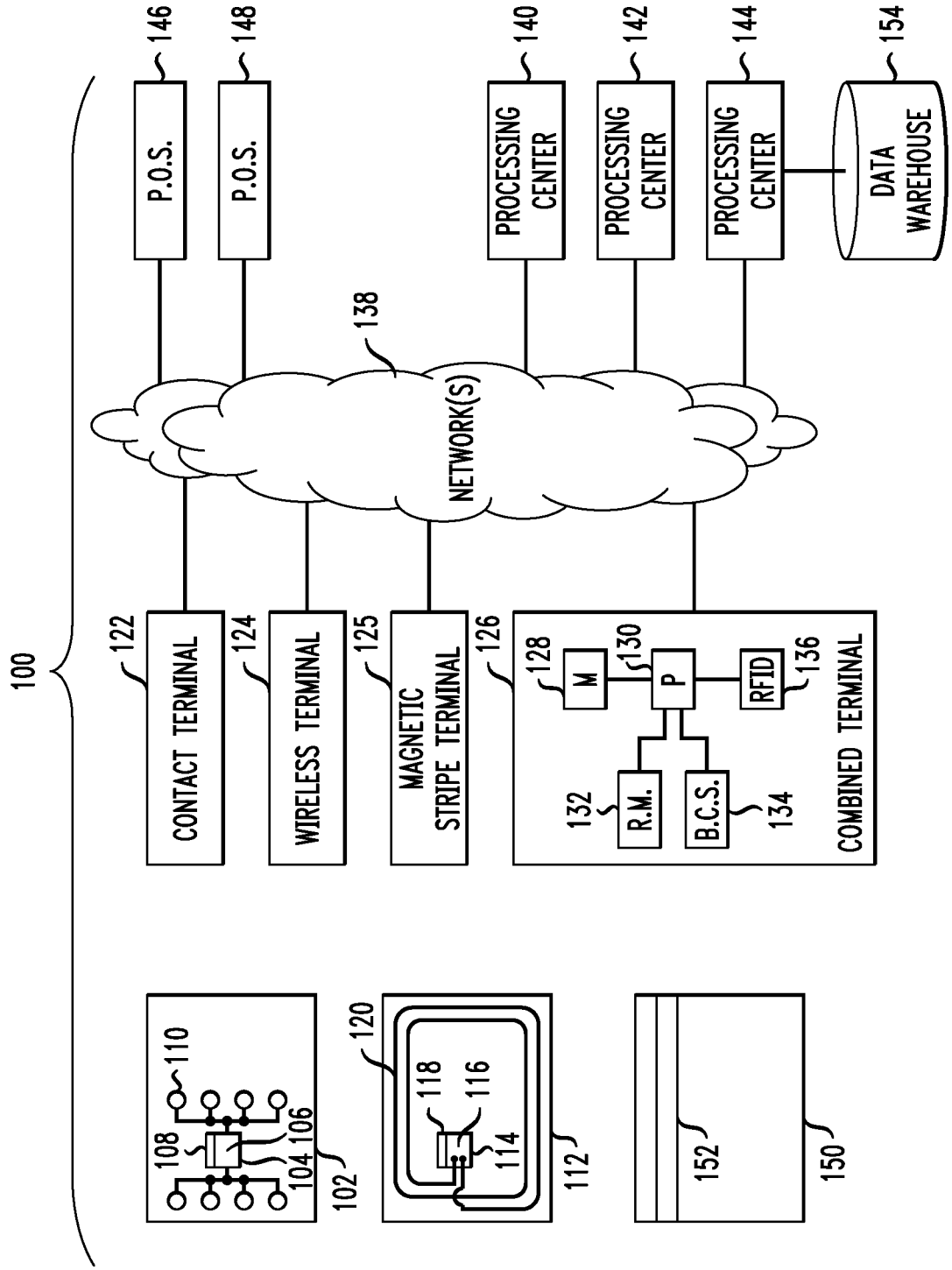
FIG. 1 shows an example of a system that can implement techniques of the present invention.

Attention should now be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. Other types of devices could include a conventional card 150 having a magnetic stripe 152, an appropriately configured cellular telephone handset, and the like. Indeed, techniques of the present invention can be adapted to a variety of different types of cards, terminals, and other devices.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic techniques.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited. St. Andrews House, The Links, Kelvin Close, Birchwood, Warrington, WA3 7PB. United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (http://www.emvco.com). It will be appreciated that, strictly speaking, the EMV specification defines the behavior of a terminal; however, the card can be configured to conform to such EMV-compliant terminal behavior and in this sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets that implement techniques of the present invention. Such devices could include cards having a conventional form factor, smaller or larger cards, cards of different shape, key fobs, personal digital assistants (PDAs), appropriately configured cell phone handsets, or indeed any device with the capabilities to implement techniques of the present invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe (or other technology) card can be employed, as discussed below.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network. More than one network could be employed to connect different elements of the system. Processing centers 140, 142, 144 can include, for example, a host computer of an issuer of a payment device. Further details regarding one specific form of network will be provided below with respect to FIGS. 4-6.

Many different retail or other establishments, represented by points-of-sale 146, 148, can be connected to network 138. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder in accordance with one or more exemplary embodiments of the present invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather attribute data, such as a product identification, from a UPC code or RFID tag on a product to be purchased. In some environments, such as, by way of example and not limitation, a transit system with a fixed fare (or a fare that depends on factors such as the length of the ride), items 134 and 136 are not needed, since, e.g., only one item can be purchased (the fixed-fare ride), identification can occur via other means, or the fare amount depends on the length of the trip rather than a specific product identification.

The above-described devices 102, 112 can be ISO 7816-compliant contact cards or devices or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner.

One or more of the processing centers 140, 142, 144 can include a database such as a data warehouse 154 for storing information of interest.

Figure 2:
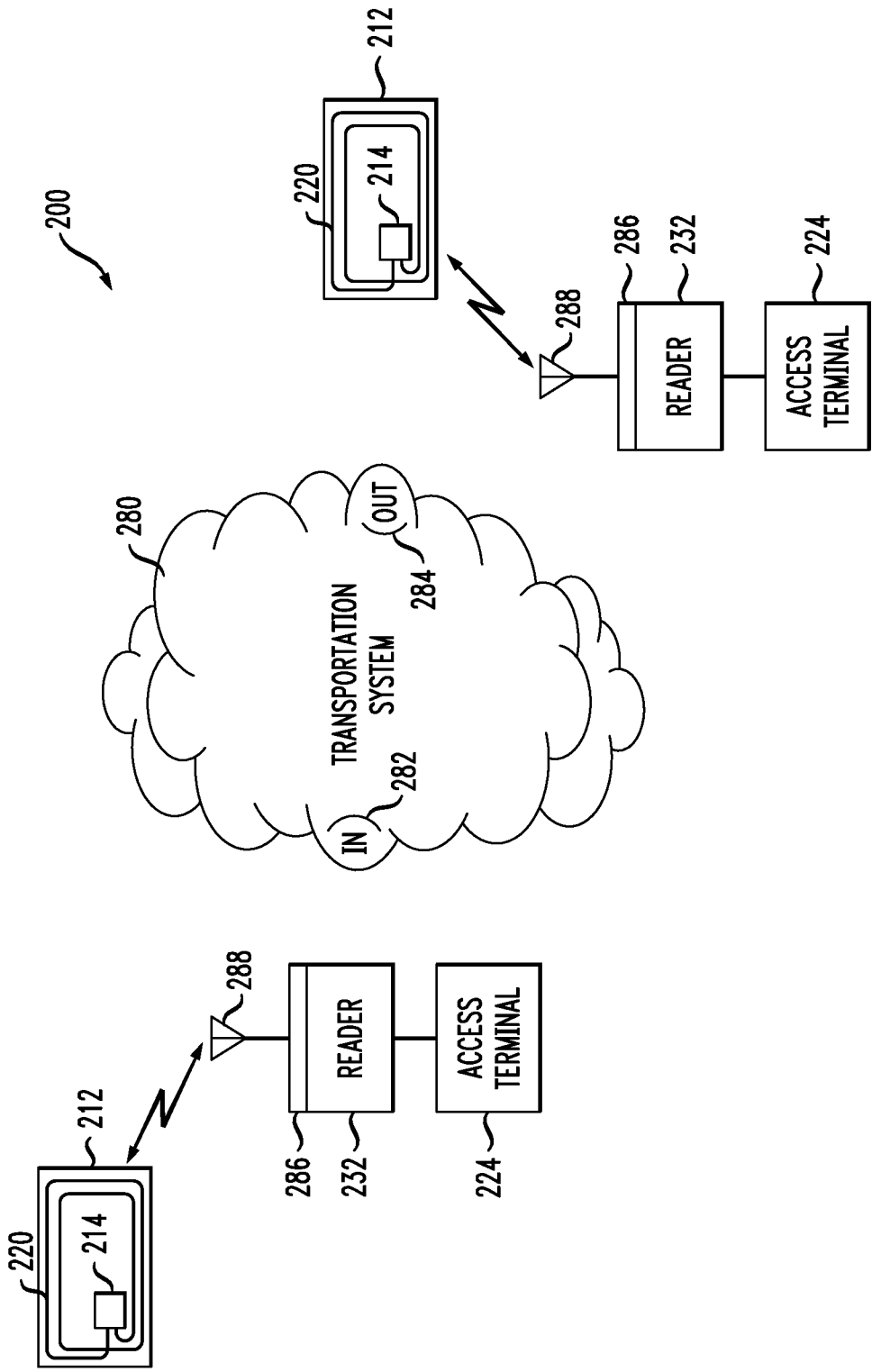
FIG. 2 shows one specific non-limiting exemplary application of techniques of the present invention to a transportation system.

Attention should now be given to FIG. 2, which depicts an exemplary system 200 applying certain techniques of the present invention to an exemplary transportation system 280. It is to be understood that this is illustrative of one of many possible applications of techniques of the present invention. Passenger access to system 280 is controlled by portable payment devices 212 and terminals 224. Elements in FIG. 2 similar to those in FIG. 1 have received the same reference character incremented by 100 and will not be described in detail again. Thus, devices 212, chips 214, antennas 220, terminals 224 and reader modules 232 are similar to those discussed above with respect to FIG. 1. The reader modules can include communications circuitry 286 and antennas 288 for wireless communications with antennas 220. Contact or magnetic stripe solutions could also be employed, in addition to or in lieu of contactless solutions.

When a passenger wishes to enter system 280, he or she causes device 212 to communicate with access terminal 224 (for example by touching or tapping at a designated location, or holding in close proximity to such location), which may reduce a balance of a payment application on device 212 (as used herein, "communicate with" is intended to cover both one and two-way cases, for example, a two-way communication scenario with a terminal and chip card, as well as a one-way scenario wherein a terminal simply reads a magnetic stripe card). A turnstile or other entrance barrier may then permit passage through entrance 282 to trains or other modes of transportation. In some cases, a passenger must again present device 212 when exiting at exit 284, as a fare may depend on a distance traveled. Further, in some cases, an excess amount is deducted at entrance 282 and is partially refunded at a later time, based on the location of exit 284 with respect to entrance 282. This helps to discourage "skipping out" without representing device 212 at the access terminal 224 associated with exit 284.

Figure 3:
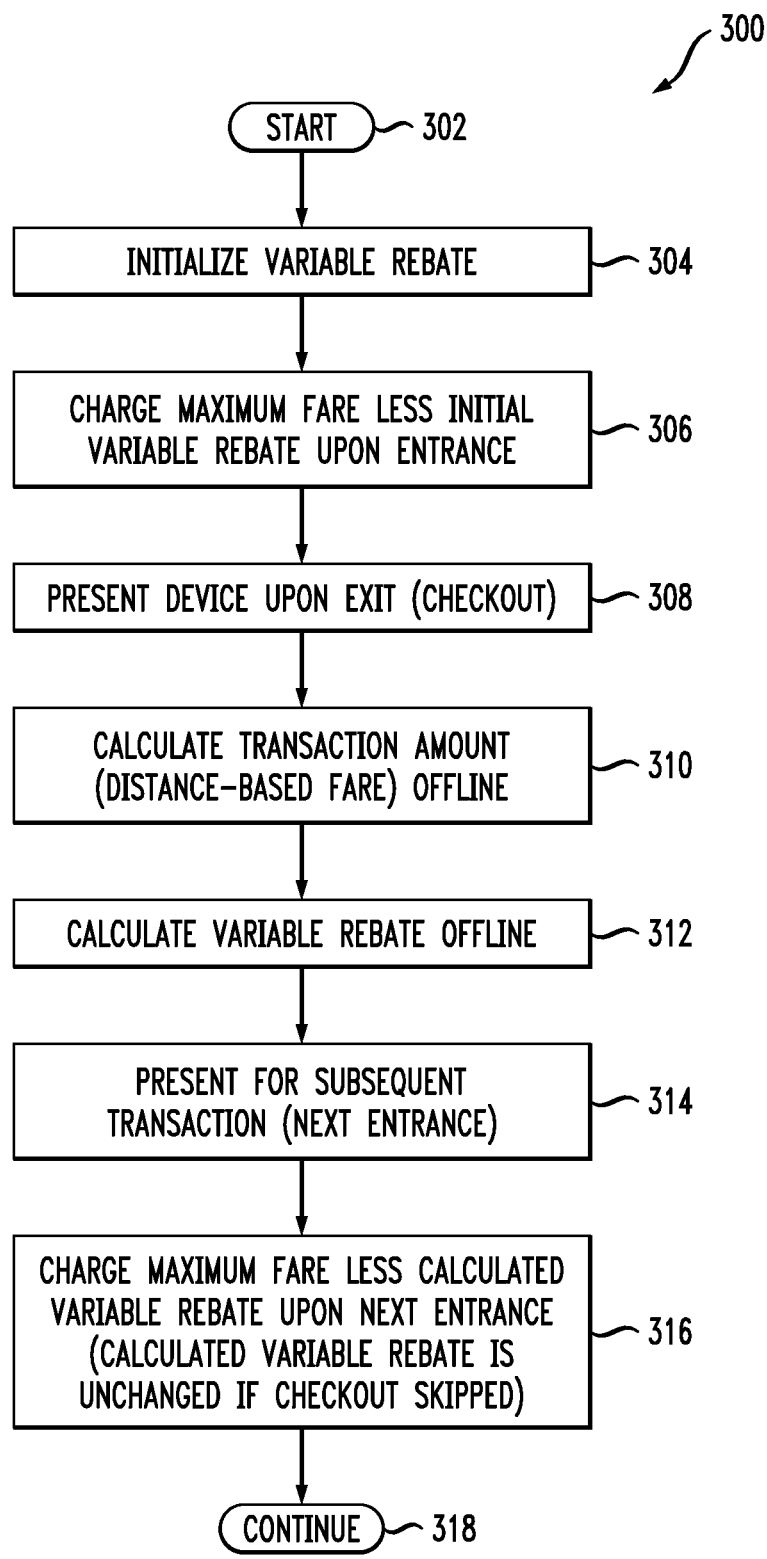
FIG. 3 is a flow chart of exemplary method steps, according to an aspect of the invention.

With reference to FIG. 3, depicted therein is a flow chart 300 of an exemplary method for payment with a payment device when a final transaction amount is not known upon first presentation of the payment device to a merchant. After beginning at 302, method 300 includes an optional step 304 of initializing a variable rebate, to be discussed below (in one more exemplary embodiments, a rebate is contemplated, but in the general case, there can be a variable adjustment, which may or may not be a rebate). Step 306 includes charging a predetermined amount (which may be zero, less than, the same as, or greater than the final transaction amount) upon the first presentation. The first presentation could be, for example, entrance at gate 282 of transit system 280, presentation of a payment device upon an initial doctor's visit, and so on. In many (but not necessarily all) cases, step 308 is included, and involves presenting the device upon exit, such as at gate 284.

Step 310 includes calculating the final transaction amount, preferably at a central server (in some instances, in an offline manner), subsequent to the first presentation. In some cases, the final transaction amount will be a distance-based fare, but it could also be a non-distance dependent fare subject to a discount calculation, a patient-responsible amount determined by adjudication, and so on. Step 312 includes calculating, preferably at the central server, a variable adjustment value by comparing the predetermined amount already charged with the final transaction amount. In many instances, the adjustment will be a rebate. Step 314 includes presenting the card or other device for another transaction (for example, the next ride on the transit system). Step 316 includes modifying a new predetermined amount charged, upon the subsequent presentation of the payment device, by the variable adjustment value. The phrase "new predetermined amount" means the predetermined amount for the next transaction; in many cases, the same as the first predetermined amount (e.g. the maximum fare). In the transit example, step 316 may involve charging the maximum fare less the variable adjustment value. Processing continues at block 318. The case of "skipping out" will be discussed below.

Calculation, in steps 310 and 312, may take place elsewhere than at the central server, but in such cases, the central server must still be informed of the result.

Embodiments of the invention also contemplate additional method steps of opening a fare gate (for example, allowing a turnstile to turn) when appropriate; for example, when the card or other device is presented upon exit and/or entrance.

In many cases, the crediting of the variable rebate will occur when the card or other device is presented to the same merchant (e.g., transit authority). However, in some instances, this could occur upon presentation to a different merchant. In such a case, the transaction could be routed to the same server (for example, the active file manager 1208 discussed below) and business rules could be implemented to determine when it was appropriate to apply the adjustment (for example, this approach could be operated like a cross-merchant loyalty program).

It is presently believed that one or more inventive techniques are most advantageously employed with cards or other devices that maintain some sort of an on-card balance (known or otherwise), since cards which are merely a token linking to an account do not really actively participate in real time transactions (they simply provide an ID for a payment transaction conducted now or later). Note that many chip cards and some magnetic-stripe cards (such as the "farecards" used in the Washington, D.C. Metro System) may hold a stored balance, and thus benefit from application of one or more inventive techniques. In some instances, one or more inventive techniques may be used with dedicated transit system cards; however, benefits obtained in such a case may not be as great as in other instances, since one benefit of one or more techniques is to move the requirement for transit data off the card or other device and into the host. Further, in some instances, one or more inventive techniques can be applied to debit and/or credit cards or other devices, such as those that are EMV-compliant.

In many instances, a database entry is maintained against some sort of card identifier (ID) so that one can look up the card (or other device) when it is subsequently presented, so as to determine what adjustment is due. It is not necessarily required to keep track of the card balance centrally (what would traditionally be regarded as an account); thus, the card identifier can be, but need not be, a card account number.

One or more embodiments of the invention can work with both contact and contactless cards (or other devices). The benefit of speeding up the transaction may be less pertinent to contact cards; however the benefits of not requiring on-card data and/or simplifying the reader (terminal) will be present in both contacted and contactless cases.

In one or more embodiments employing stored balance cards, the balance is maintained on the card (or wherever else it is normally held using current techniques), while the adjustment (typically but not necessarily a rebate) amount is maintained at the server.

As noted, in one or more non-limiting embodiments, the merchant is a transit authority associated with a transit system 280, the final transaction amount is associated with a distance-based transit fare, and the first presentation is presentation upon entrance to the transit system. In such case, the method can include the additional step 308 of checking out of the transit system by presenting the payment device upon exit from the transit system. In this case, the calculating step 312 is also conducted subsequent to the checking out, and the transaction amount is based on (at least): (i) the presentation upon the entrance and (ii) the checking out (that is, it depends at least on the distance traveled—which should be broadly understood to include physical distance traveled, number of zones passed through, or some other "distance-related" calculation). In some instances, as noted, the predetermined amount is a maximum fare, and the variable adjustment value is the difference between (i) the maximum fare and (ii) the final transaction amount.

In some instances, in the modifying step 316, the subsequent presentation is in connection with a subsequent transaction, and the modifying involves initially charging the predetermined amount, less the variable adjustment value, for the subsequent transaction (that is, the initial charge for the subsequent transaction is the predetermined amount (e.g., maximum fare) less the adjustment due from the previous travel). As will be discussed further herein, in addition to the modifying, the central server may make a "go/no-go" access control decision as well (that is, decide whether to let the person into the transit system).

In some instances, as noted, a user may "skip out" improperly without presenting the card at the exit fare gate (turnstile). In such a case, an additional step can include applying a value of zero to the variable adjustment value when the user of the device fails to check out of the transit system upon exit (this effectively means that the customer will have paid the maximum fare regardless of the distance traveled; it would also be possible at this point to apply a penalty fare by adding a positive value to the adjustment value). This is indicated in the flow chart 300 by the parenthetic in step 316. Note the distinction between cause and effect; the rebate value is unchanged rather than (necessarily) zero because there is no check-out presentation and therefore no adjustment to be made to the original predetermined amount. Thus, the terminology applying a value of zero is employed. By way of further explanation, the adjustment amount may already have a value and rather than setting this previous adjustment value to zero, a zero further adjustment would be employed, leaving the previous value unchanged. Since the adjustment is normally determined based on what was charged at check-in, less the adjustment calculated based on check out, and since there was no check out, the charge at check-in is correct.

As noted, step 304 is optional. Where performed, it includes setting the variable adjustment value to an initial value, prior to the first presentation. For example the adjustment value could be initialized to the maximum fare less a minimum fare. In this way, a user having a balance at least equal to the minimum fare may enter the transit system upon the first presentation of the device.

One or more embodiments of the invention may have applicability in a number of scenarios, including, by way of example and not limitation, transit and health insurance. Purely to present an example, one particular transit environment, in which one or more inventive techniques may be employed, will now be described with regard to FIGS. 4-6. It will be appreciated that transit applications present issues of access control, i.e., whether to let a person into the system, as well as payment, how much to charge the person, and how and when to do so. Typically, transaction timing is important in a transit environment, such that access and/or payment determinations are advantageously made quickly (and any time-consuming calculations are preferably done after the event). With respect to FIGS. 4-6, operation of an exemplary system will be described with regard to access control and loading of the balance onto the card or device.

Figure 4:
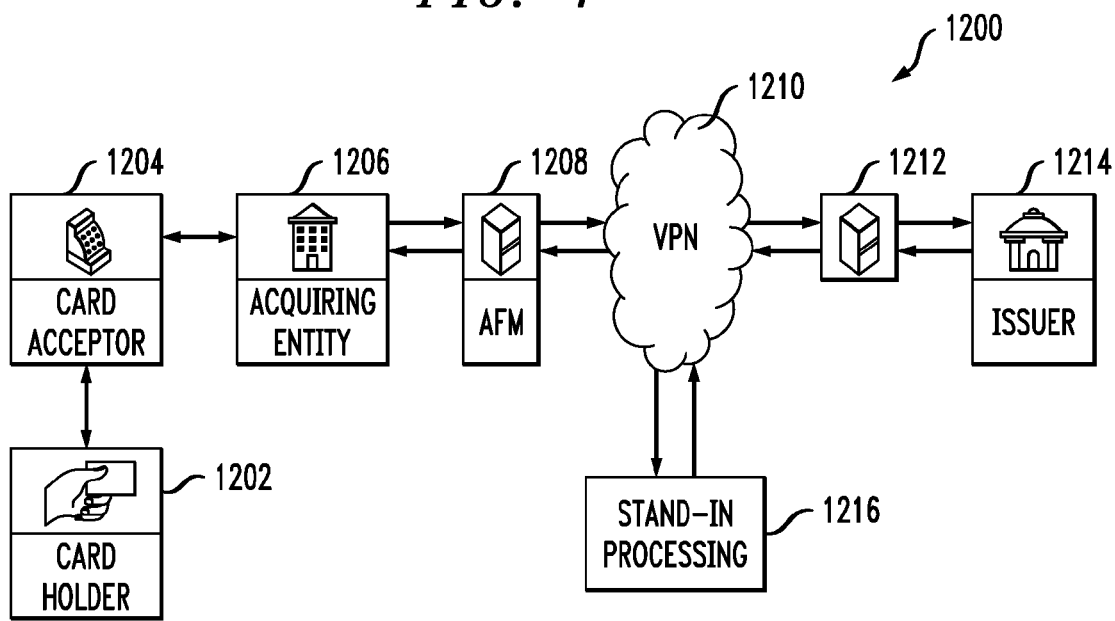
FIG. 4 shows initial and periodic authorization flow in a system that can implement techniques of the present invention.

Attention should now be given to FIG. 4, which is a block diagram 1200 of one possible specific exemplary system which can employ one or more techniques of the invention, also depicting (via the arrows) certain exemplary data flows. A request may originate from a merchant and/or acquiring entity (for example the bank holding the merchant's account), and may traverse the payment network (in this case a VPN 1210 to be discussed below) to the issuer. The issuer 1214 then sends a response (or a stand-in processor 1216 sends it on behalf of the issuer) back through the payment network, to the merchant and/or acquiring entity. The request and response may employ standard formats (although the contents are not necessarily "standard").

As shown at 1202, the holder of a card or other payment device interacts with a terminal at a facility of a card acceptor 1204, corresponding, e.g., to terminals and points of sale as described with respect to FIG. 1 or fare gates as described with respect to FIG. 2. The card acceptor sends transaction information to an acquiring entity 1206, for example, via a network such as described in FIG. 1. By way of example and not limitation, an acquiring entity could include an acquirer or other entity responsible for the acquired transaction, whether they are referred to in common use by artisans skilled in the electronic payment arts as an "acquirer" or an "acquiring processor," and the like (the acquiring entity can also be referred to as a consolidator). An active file manager (AFM) 1208 can be provided between acquiring entity 1206 and a telecommunications network such as VPN 1210 (which can be, for example, a payment processing network). The AFM 1208 can be located in a variety of places, e.g., at the acquiring entity's facility, and could be operated by, e.g., an acquirer. Further, AFM 1208 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 1210. In summary, manager 1208 can be connected to network 1210 for authorization processing, but as noted, can be located in a variety of places.

Another conventional front-end communications processor 1212, such as a MIP™ processor, can be located, e.g., at the facility of an issuer 1214 to provide access to the aforementioned VPN 1210. Of course, there may be a plurality of similarly-equipped issuer, and other, facilities.

Stand-in processing can be provided via an authorization subsystem located at a central location 1216. Such subsystem can interface with the VPN 1210 and can respond to provide authorization service on behalf of issuer 1214 when, e.g., the issuer is a member or other customer or entity not connected via the VPN, is unavailable, cannot be reached, or responds late (for example, outside the time limits specified by the network). Most or all members and/or customers may be electronically connected to the payment processing network operator via the VPN, as issuer 1214 is in FIG. 2.

Figure 5:
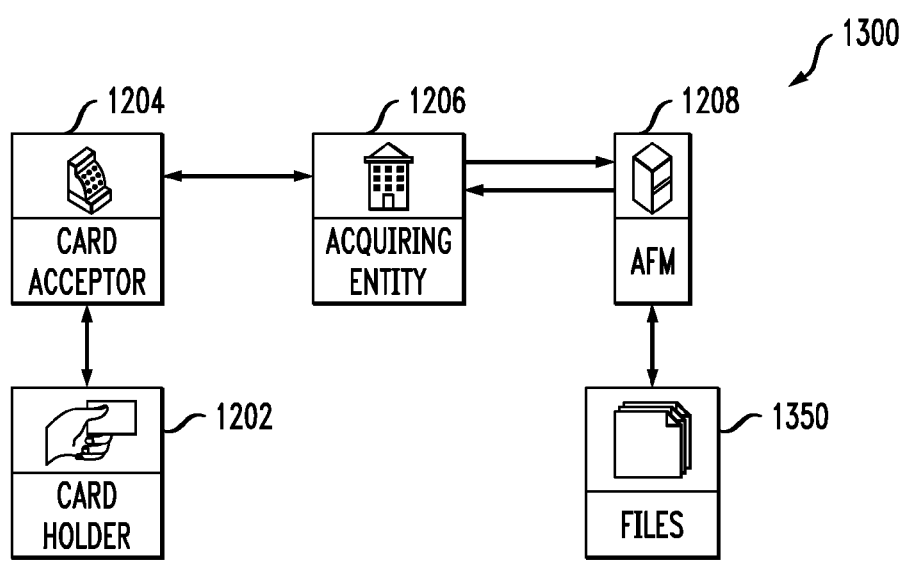
FIG. 5 shows file processing flow in a system that can implement techniques of the present invention.

FIG. 5 shows a block diagram 1300 of certain optional features of system 1200, which can be configured to implement a file processing flow useful with one or more embodiments of the invention. Items similar to those in FIG. 2 have received the same reference character and will not be described again. The arrows are for convenience in depicting the file processing flow. In block diagram 1300, Active File Manager 1208 is provided with an appropriate file structure 1350 to be discussed further below (as discussed below, in some instances, structure 1350 may be a list or "constructed file"). In one or more embodiments, the AFM (Active File Manager) has an AFL (Active File List) that is a constructed file of both positive and negative accounts. That is, it is a list of all accounts active in the transit (or other) system, and potentially also drawing upon lists from other sources such as the International Hot Card Lists from MasterCard, Visa, and the like.

To accelerate terminal decisioning in high volume environments such as the transit market (where transactions may often be for a relatively small monetary amount), the offering of an authorization message from the merchant to the issuer can be facilitated. The first time a cardholder account number is utilized at the merchant location (in such a case, the account number will typically not be on merchant file yet), the transaction can be (optionally) automatically approved (in one or more embodiments, by an intermediary such as the Active File Manager to be described herein). Following the issuance of the approval response to the terminal, a payment processing network operator (including, by way of example and not limitation, an entity colloquially known as a "credit card company") can facilitate an authorization message all the way to the issuer for that cardholder account number. The dollar (or other currency) amount reflected in the authorization request can be based on desired spending limit parameters established by an entity such as the merchant and/or the issuer. If the issuer declines the authorization, the spending limit will (in some instances) be set to zero for that cardholder account number, for example, by making an appropriate entry in a file designated as the active file, to be discussed further below. In addition to, or in lieu of, setting a spending limit to zero, one could instead set a flag to indicate that the issuer declined the authorization. If the transaction is approved, a spending limit equal to the activity limit amount for a certain time period (e.g. the pre-authorization amount for a day), preferably (but optionally) less the value of the first transaction, can be established, again, e.g., via an appropriate entry in the active file.

Each subsequent transaction can be verified, for example, against the active file, to determine if the account has a "pre-approved spending limit." As additional transactions decrement against the spending limit, authorization requests can be initiated to the issuer to replenish the spending limit. Note that the merchant could elect to perform an authorization for the first transaction before sending a response to the terminal. The merchant may wish to weigh the response time against the financial risk of the transaction.

By way of summary and presentation of further detail, in some instances, the first time a card is presented (that is, a card not previously used in the system), access to a controlled area, such as a transit system, may be allowed by default, since there would typically not be time to perform a full, traditional credit card authorization. Subsequently to allowing access, however, one could perform an authorization request and set a flag indicating the status (for example, that the account number was not yet on file). In some instances (for example, post funding), the authorization might be for only a nominal sum, such as one dollar or the like, merely to determine that an account is in good standing. The distinction between pre-fund and post-paid approaches should be set forth at this point. In a post-paid transaction, we perform the authorization, allow the rides to be taken, and then clear and settle. In a pre-funded transaction, the complete financial transaction (authorization, clearing and settlement) occurs typically prior to the card-holder taking the rides. It should also be noted that in one or more embodiments, with the first tap (presentation of the card), the decision to allow the cardholder to either ride or to wait for the issuer authorization response is based on a system parameter set by the merchant (for example, the transit agency).

The on-line authorization feature also means that these transactions can be sent to a location such as 216 for stand-in processing, on behalf of the issuer, should the network experience communication problems. As with any stand-in processing, the transactions can be stored and forwarded to the issuer once the issuer is able to receive messages again; either as individual messages or in a batched format.

Note that the above-described flow is typical of the authorization that can be sent all the way to the issuer or stand-in processing facility, on behalf of the issuer. It can be performed for the first transaction that is seen for a particular account number and then periodically after that first transaction. The authorization is sent, e.g., after an active file response is provided to the merchant, based on the active file process flow described below. Once the account number is known in the system (after its first use), subsequent authorizations can be performed prior to the open-to-spend balance reaching a pre-determined value, such as zero. Once the value is depleted, the open-to-spend balance can be reset by conducting another authorization.

Front end processors, such as processor 212, and VPNs, such as VPN 210, are well-known to skilled artisans. In one specific example, the processor 212 is a MIP™ processor, and the VPN 210 is a telecommunications network providing MASTERCARD BANKNET® telecommunications network services (registered trademark of MasterCard International, Inc. of Purchase, N.Y.).

Examples will now be given of content of exemplary files in file structure 350, which may be maintained on processor 208 by a payment processing network operator; it is to be appreciated that these are exemplary in nature, and various implementations may include less than all the indicated parameters, and/or may include additional parameters not discussed here. Further, files may be combined or additional files may be employed as desired. Contents of an account range file may include, but are not limited to, one or more of a low range, a high range, a transaction-allowability indicating parameter indicating whether certain (e.g., transit system such as bus, subway, metro, underground) transactions are allowed, an authorization frequency in time units such as days, an authorization frequency in terms of number of transactions, and the like. The low range and high range might specify a range of account numbers eligible for a certain kind of transaction. For example, for sixteen digit account numbers, the eleven most significant digits of a lower limit on eligible account numbers and the eleven most significant digits of an upper range of eligible account numbers might be specified. The parameter indicating whether certain transactions were allowed could have, e.g., a simple yes or no value.

Contents of the aforementioned active file may include, but are not limited to, one or more of an account number, a limit parameter (such as maximum dollar amount per transaction), a last authorization date, a number of transactions since authorization, an authorization frequency in days (how much time, e.g., how many days, between authorizations) and an authorization frequency specified in transaction terms (e.g., how many transactions between authorizations).

Still with regard to element 350, in some instances, the AFM 208 will "look" at a constructed file system (referred to as the "active file list" or "AFL") or a file that points to other files; that is, element 350 could be such a constructed file system or file that points to other files. In this case, the other files could include a restricted card list (also known as "restricted control list" or "RCL") from a first payment association, such as MasterCard International Incorporated, of Purchase, N.Y., a "hot" card list (from, for example, a transit authority operating a transit system using one or more embodiments of the invention), a list of substantially all recent activity, the restricted card lists from other payment associations (for example, Visa International Service Association of San Francisco, Calif.), and the like. The so-called RCL of "hot" card lists may include, for example, cards believed to be lost, stolen, fraudulently used, and so on. By way of summary, in some instances, we may combine all the RCL lists (for example, MasterCard, Visa, transit authority) plus the list of active accounts together in one list so the AFM can perform a review—basically, the AFM decides if it has seen the account before, and if so, does it have a positive or negative status; if it has not been seen before, a determination may be made regarding what the appropriate business rule is to generate a response. In conclusion, we may pull substantially all pertinent data regarding account status together to make operation easier faster and less expensive.

In general terms, a single file or a constructed file or list available to the AFM may contain at least negative account status information for a number of accounts (the different RCLs, for example), and automatic approval may proceed only if an account number is not found on one of the RCLs. Appropriate file(s) or list(s) may, in some instances, be maintained in random access memory (RAM) for quick access.

An exemplary periodic (for example, nightly) batch file maintenance process will now be described. In terms of the account range file, the dedicated processor, such as 208, can receive a periodic update file, such as a nightly refresh file, from the payment processing network operator based on information from the issuer, and a full file replace (or alternatively application of the appropriate additions and/or deletes to the current file) can be performed on the dedicated processor. That is, a periodic update file may include a complete refresh, or directions to add and/or delete certain records in the file. In terms of the active file, all account numbers that have not been used within X days can be deleted (X is a parameter that can be specified by the merchant, acquirer or other acquiring entity and/or processor) based on the last authorization date. The skilled artisan will of course appreciate that in this context, "processor" means an entity such as the acquirer or other acquiring entity, payment processing network operator, bank, large merchant, and the like, not a piece of hardware. Further, an authorization can be periodically requested for those account numbers previously found on the payment processing network operator's "stop list" to determine whether the account number has been unblocked by the issuer.

In certain environments, such as automated fare collection (AFC) in a transit system, transaction timing is quite significant. In many ordinary applications, timing is just an engineering or system requirement. However, transit applications, such as subway turnstile access, may have timing requirements on the order of, say, 300 ms. Typical credit card authorization times may run, for example, from 1000 ms up to 18 seconds. This is simply not acceptable, in order to get passengers rapidly through a turnstile or similar fare gate. Subway turnstiles are but one example of many transit applications, such as bus, subway, light and/or heavy rail, ferries, parking, and the like. It is currently believed that subway applications may have the most severe timing requirements.

One or more inventive embodiments may address the aforementioned issues by making a fast decision, using the same criteria as in normal credit card authorization, but on a high-speed, transit-specific platform (or platform specific to other applications with fast transaction time requirements). The aforementioned AFM may function as a gateway to a payment processing network, such as the MasterCard Banknet® communications network, and may typically be resident on a merchant's or acquirer's premises—in one or more instances, the AFM may be a server that the operator of a payment network places on the merchant's or acquirer's premises to help facilitate such parties performing authorizations. As noted elsewhere herein, the AFM may have access to files or lists such as Restricted Card Lists (RCLs), a restricted list from a transit authority, and so on—such lists may include, for example, account numbers associated with fraudulently used, stolen, and/or lost cards, and the like. Advantageously, in one or more preferred inventive embodiments, the RCL and the like reside on the AFM and not in a terminal such as a turnstile.

Since, due at least in part to the large number of entries in typical RCLs (for example, about 800,000 to 1,500,000), requests for authorization may not be processed sufficiently quickly at the local terminal level, one or more inventive embodiments enable such authorization to be performed at a server (high-speed computer) level. In the exemplary context of access to a transit system, one can think of two separate aspects: (1) request for entry into the transit system (in some instances, as will be discussed further below, a request can proceed from the fare gate, routed through an inventive payment platform, to an AFM for quick decision making), and at a later time (2) payment approval and settlement mechanics will be performed. Where an existing card is presented (that is, its record is present in the inventive system as it has been previously presented to the system), a check can be made regarding whether the card has a positive or negative status. If the card does not yet "exist" (that is, its record is not yet present in the inventive system since it has not yet been presented to the system), the various restricted lists (from payment system operators, the transit authority, and the like) can be checked so as to perform a reasonable due diligence that the card is valid. In some instances, one can also perform standard checks, such as checking the bank identification number (BIN) range for the issuer, performing the Luhn technique or Luhn formula, also known as the "modulus 10" or "mod 10" technique, which is a simple checksum formula used to validate a variety of identification numbers, such as credit card numbers and the like. It is known to the skilled artisan and is described, for example, in U.S. Pat. No. 2,950,048. Other standard tests that can be performed include expiry date and a velocity check parameter. The latter may be a dynamic parameter set by a merchant, such as a transit system operator. For example, there may be a limit of X number of appearances of a particular PAN in the system, for example, 5 or 10 in one day. Such an approach limits the number of times that one can use that particular device in the system over a period of time.

In one or more embodiments, a high-speed telecommunications network, with a minimum speed of 768 kbps, can be employed, for example, from the turnstile (fare gate) to the server. The server may be resident, for example, on merchant (transit authority) premises, on an acquirer's premises, or housed in a facility of an operator of a payment card network (such as MasterCard International Incorporated) or a facility of a third party processor, and the server may be operated, for example, by the aforementioned operator of a payment card network, or by a third party vendor. In one or more embodiments, the aforementioned server functionality may be embodied, for example, in the payment platform 704. In general terms, the platform and AFM can physically reside anywhere; for example, the Transit Agency premises, premises of a Third Party Processor/AFM Integrator, or even on the Premises of the operator of a payment card network, such as MasterCard International Incorporated. It is, however, desirable that there are high speed connections between the terminal estate, the platform, the AFM, and payment processing system (such as MasterCard's BankNet® network or the like).

In one or more embodiments, a registration process may be conducted; thus, one or more embodiments of inventive methods may include a step of facilitating registration (for example, to select pre- or post-funded functionality). Someone who has never used the facility, such as the transit authority, before may be provided with, for example, two ways to register: (1) access a registration web site or (2) a call center, and authorization is performed as a result of the registration. Several types of payment options may also be provided, for example: (i) pre-funded and (ii) post-funded. If one selects a pre-funded approach, authorization, clearing and settlement will be conducted for a full amount, say $20. Subsequent "taps" will decrement such full amount. "Taps" refer generally to presentation of a payment device; in some embodiments, such devices can be MASTERCARD PAYPASS® smart cards or similar devices (registered mark of MasterCard International Incorporated, Purchase, N.Y., USA). In this example, for simplicity, assume a single tap on entry. When a certain threshold, say $10, is reached, the system performs another "auto-load" or "top-up," for, say, $20. So, in this example, the system loads initially $20, decrement to $10, and an auto-load of $20 brings the account balance up to $30. It should be noted at this juncture that in one or more embodiments, the payment card or other payment device that a person uses to access a system, such as a transit system, can be similar to device 112 as shown in FIG. 1, and, in one or more embodiments, may be the aforementioned MASTERCARD PAYPASS® smart card.

In some instances, in addition to or in lieu of the pre-funded option, a post-funded, post-paid, or aggregate approach can be offered. This could also involve several options, for example, one could access a website or a call center and pre-register, and a pre-authorization could be conducted. This pre-authorization might be, for example, just a nominal amount such as one dollar, inasmuch as on debit accounts, some people manage their accounts so closely that even a twenty or thirty dollar charge is material, so that in some instances, the initial authorization amount may be advantageously reduced to a nominal amount such as one dollar. Stated differently, the system does not perform an authorization for the full value of what the transaction will be; rather it just validates that the account is a good one, and have the issuer acknowledge that. In another option, the user can simply step up to the turnstile and tap his or her card for the first time. An authorization request is then routed to the AFM, and based on the information that the AFM has at that time, the system makes a decision and provides an approve/decline response to the request for entry into the system. For example, if the account number is not on file (first tap), the system could do a quick check of the account range; if that raises a flag, then decline the request; if no flag is raised, the system could perform a more detailed, payment processing network, issuer approved, authorization or just approve the request.

The transit authority may have the option to automatically approve the first appearance of the device. In this case, as part of processing flows by the AFM, which performs one, some, or all of the above-described checks, such as expiry date, Luhn test, restricted card lists, upon checking the AFL, the AFM will recognize that as this device PAN is not on the AFL, it is being presented for the first time, and will automatically approve it (risk is limited to the value of one subway fare). Another option is a separate authorization terminal or "activation station"; that is, a separate dedicated terminal that is typically located in a facility of the transit authority but is distinct and separate from the fare gates. One could use this option if the transit authority experiences excessive fraud as a result of an auto-approve option. In this approach, post-funded customers register first by stepping up to the separate "activation station" terminal where they must present their card for the system to perform a full authorization (through the AFM, Banknet (payment processing network) all the way to the issuer and back, to ensure that the account is valid). This is a risk-mitigation option. Use of the separate "activation station" terminal for this approach prevents passenger queue delays at turnstiles and the like.

Further exemplary details will now be provided with regard to the post-paid option. Aggregation typically works based on two parameters—X dollars or X taps in Y timeframe; these may be dynamic parameters set by the merchant, such as the transit authority. For example, there may be a threshold limit of 10 taps in 2 weeks. One might allow, say up to 10 taps, or elapsed time of up to 2 weeks, whichever comes first—in essence, the reverse of the pre-funded approach—instead of decrementing usage activity, the system aggregates it, and once a threshold is reached, the system initiates a financial authorization for the value of the balance of the account. So, in this example, when the system receives notice of the tenth ride (tap) which equates to a balance of say $20 dollars, the system will automatically go out for an authorization for $20 dollars. This is cleared and settled offline, and the account is then reset and listed in good status. In this way, the system will have a record that the account is in good standing when the rider shows up to enter the transit system again. Thus, in general terms, limiting conditions as discussed elsewhere herein can, in some instances, include the condition that a predetermined number of presentations (taps) have taken place at the transit authority or other merchant, or that a predetermined amount of time has passed since the last authorization from the issuer. Further, as discussed below, parameters such as limiting conditions may vary based upon a brand of payment device or among different types of products within a brand.

It should be mentioned that throughout this application, words such as "one" and "we" are not necessarily intended to imply human agency, but may refer also to steps done partially or entirely by computers or other automated techniques.

As noted above, in some approaches, when an account has a bad (negative) status (the issuer's authorization decision may be to decline the transaction), the system sets the account limit to zero or even a negative value. However, as also noted, alternatively or in addition to so doing, the system might flag the bad (negative) status and keep a positive balance limit (perhaps reflecting a remaining pre-paid amount). For example, in the instance of a pre-paid customer; he or she may have an initial 20 dollar balance that, through his or her usage, is decremented down to 10 dollars. Where 10 dollars is a pre-established threshold, the system initiates a "top up" or autoload authorization that could be declined by the issuer, i.e., authorization is declined. The system will record the decline result of the authorization request, but continue to permit the person to decrement the residual balance through ridership, and when the account balances reaches zero, the system can then set the account to a negative value for status purposes. Another reason why the system may simply flag a negative status is as follows: as defined in ISO8583 (which is expressly incorporated herein by reference for all purposes in its entirety), there are a large list of response codes which can be used to convey various information, and the merchant, such as a transit agency, may choose to do a "soft" versus a "hard" decline on the person's account. A "soft" decline may be appropriate where the expiry date is past or the account owner is over his or her credit limit. A "hard" decline could be appropriate where the response codes indicate an account with lost and/or stolen cards. One may also want to establish a parameter based period of time that effectively allows the issuer to remedy the problem with the end user. These are some exemplary reasons to separate the account status from the balance.

Figure 6:
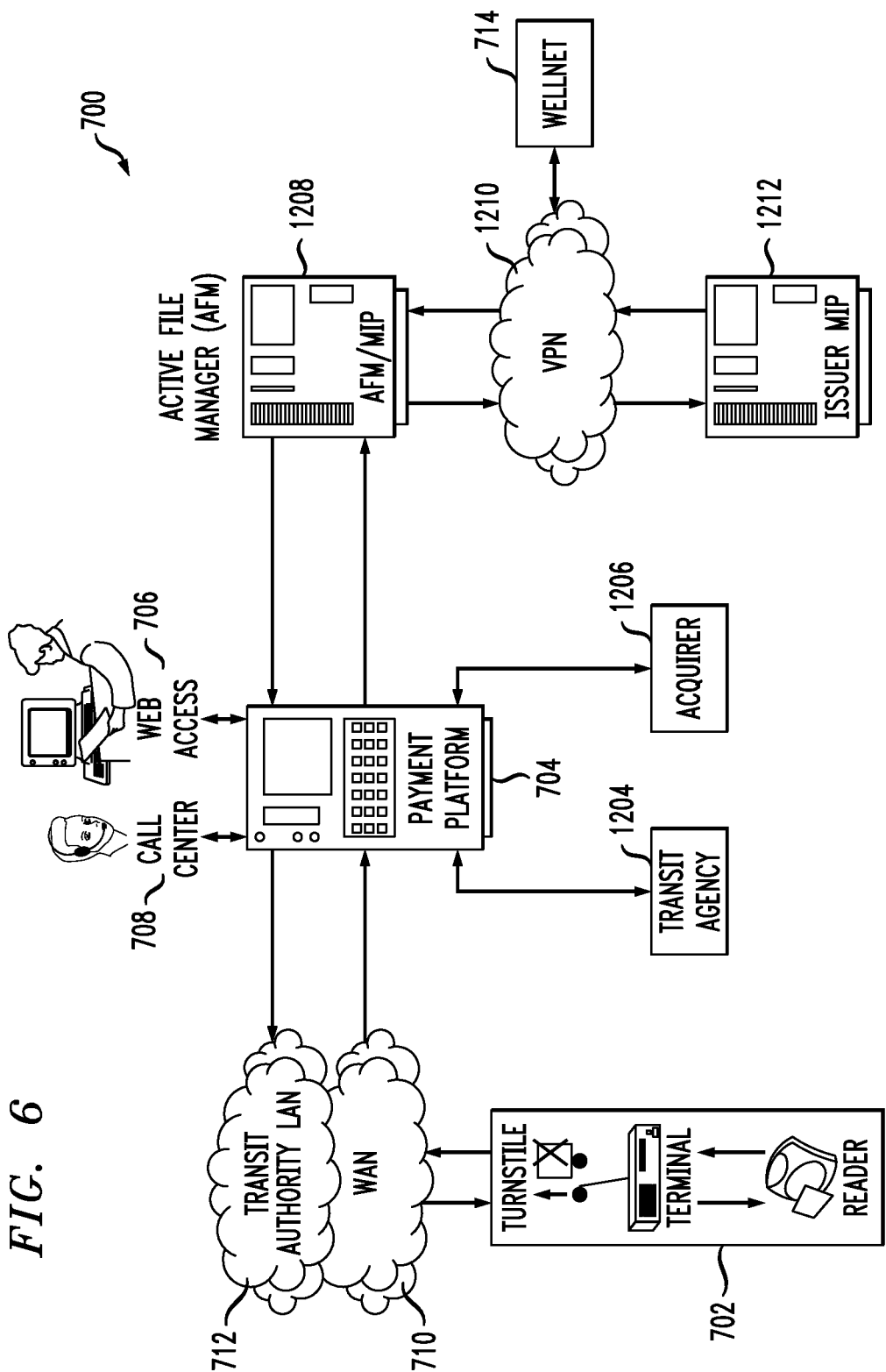
FIG. 6 is a system diagram of an exemplary transit solution that can implement techniques of the present invention.

Attention should now be given to FIG. 6, which depicts an exemplary detailed architecture for an exemplary AFC solution 700. The architecture is similar to that of FIGS. 4 and 5, but more detailed, and items similar to those in FIGS. 4 and 5 have received the same reference character. In general terms, three significant components of the system are the fare gate assembly (turnstile, reader and terminal) 702, payment platform 704, and AFM 1208. Platform 704 may be in communication with assembly 702, for example, via WAN 710 and/or LAN 712. AFM 1208 may also be in communication with platform 704, over a high speed communications network, and the components may be cooperatively configured to carry out one or more method steps disclosed herein. In one or more embodiments, the connection between AFM 1208 and platform 704 can be accomplished via a gigabit LAN connection.

AFM 1208 functions as a decision maker, going through appropriate criteria and performing a check for people attempting to access the transit system. Platform 704 functions as a record keeper, gathering records of requests, responses, and subsequent authorizations; keeping records of accounts; performing reconciliations and other accounting functions; updating account balances based on activity (for example, decrementing/aggregating and generally tracking transit system rider usage and transaction activity); facilitating pre-registration; and so on. Platform 704 may also handle web access 706 and assist customer representatives in call center 708.

In one or more embodiments, with the first tap, the decision to allow the cardholder to either ride or to wait for the issuer authorization response is based on a system parameter set by the merchant (transit agency, for example). Entry decisioning advantageously takes place between fare gate 702 and AFM 1208; with platform 704 acting as a router. Financial authorization could be prompted by AFM 1208 or platform 704. If by the AFM 1208, upon the first time tap (based on a parameter set by the transit agency that made a business decision to assume the risk), the system could just allow access or (if the transit agency decides otherwise for risk aversion or other reasons) could force the rider to wait for the issuer authorization to be completed. The AFM "sees" it is a first time tap, automatically approves, and sends an authorization that goes through a VPN such as the BankNet® network 1210. Another case when an authorization might be prompted is as follows: a user calls in to call center 708 or goes to a web site 706 to set up an account. A customer services representative at 708 interfaces with platform 704, and if it is the first time it has seen that the system has seen this particular account, it will initiate an authorization. Yet another case when an authorization might be performed is as follows: where the transit user's activity caused the balance to near a pre-established threshold, from decrementing or aggregating, and the system then initiates another automatic transaction for the appropriate value.

For example, a user may opt to pre-fund his or her account balance for 20 dollars, and his or her subsequent usage may cause the system to then decrement his or her balance down to 10 dollars, at which time the system may initiate an automatic prompt for a new authorization through the AFM 1208 to VPN 1210. In the aggregate approach, a rider might tap ten times, reach his or her account threshold, and then there would be an automatic prompt for a new authorization. When an authorization to the issuer is desirable but time is critical, such as in the instance of first time access, or when the decrementing/aggregating approaches a predetermined limit, such as ten taps, the system may (based on a transit agency business decision and set parameters) to simply allow access to the system without a detailed check, and then in near real time perform an authorization to the issuer.

In the classic merchant card processing scenario, the merchant's (transit agency in this example) acquirer processes all of the card transactions for the merchant. There are three steps to handling a card transaction: authorization, clearing and settlement. The acquirer typically routes each of these transactions to the respective card association, that is, Visa, American Express, MasterCard, Discover and so on. In one or more exemplary inventive embodiments, such as a transit platform solution, it is a card association (operator of a payment card network), such as MasterCard International Incorporated, and not the acquirer, that is performing the authorization for the merchant and then later passing a record of the result of the authorization, along with the clearing and settlement records, to the merchant's acquirer for processing. Inasmuch as such card association (for example, MasterCard) is conducting the actual authorization over its own proprietary VPN system, instead of routing the third party card (for example, non-MasterCard) authorization requests outside the system, in one or more embodiments, there may be unique parameters established to treat each brand or product separately. By way of example, if the operator were MasterCard, and Visa or American Express, or even another MasterCard product, such as the Maestro™ product (European debit product) follow a different set of rules for authorization, clearing and settlement, the inventive platform 704 can be designed to handle them accordingly.

One possible example of applying different rules based on brand is as follows: suppose a card is presented for which RCLs are not present in the AFM. For example, suppose the AFM can access a constructed file for MasterCard, Visa, and a transit authority list of troublesome accounts, but the constructed file does not include American Express or Discover products. When such a product is encountered, since no RCL information is available, a full authorization may be forced before the cardholder is given access to the system. This is but one example of applying different rules for different brands of cards or different products within a brand.

Subsequent handling of full value authorizations, settlement and clearing can, in some instances, also be brand-by-brand. Visa or American Express may set their own aggregation rules, different than those of MasterCard. For example, MasterCard may have a limit of 25 dollars or 10 taps and Visa may have a limit of 15 dollars or 5 taps. Merchants might thus be protected up to 25 dollars with MasterCard and up to 15 dollars with Visa. Whether pre-funding or post-funding (aggregation) is employed, in one or more embodiments, authorization, clearing and/or settlement can be parameter-based and vary by brand or products within a brand.

As noted, three significant components of system 700 include the terminal 702, the platform 704 and the AFM 1208. Given the size of a transit agency's terminal estate (may vary, for example, from 100-5000), and the correspondingly large number of individual rider transactions, records of this activity are typically communicated from one component to another in regularly scheduled batch transmissions. However, based on the amount of time that passes in between each batch, the information upon which the AFM bases its decision may be delayed, or otherwise stale. Thus, in one or more embodiments, the system 700 is designed to manage the flow of information across an open communication channel so that each component 702, 704, 1208 is updated on an as-near real time basis as permissible, given the volume of communications that occur in any given time sequence, based on pre-established QoS (Quality of Service) prioritization. Typically in ordinary credit card processing systems, updates to the RCL are done every 4 hours or so. In AFC systems, updates may typically be done periodically in batch mode. Terminals 702 may communicate to the host server 704 in batch, and the host server may perform authorizations in batch. One or more embodiments of inventive systems work on the real-time exchange of information. As the transactions occur, the systems share that information over open interfaces and update each other real-time per QoS (Quality of Service) prioritization. In one or more embodiments, the AFM 1208, platform 704, and terminals 702 all update themselves on a real-time basis. In general terms, data and/or file transfers can occur in batch and in real time based on QoS prioritizations; some transfers may occur as soon as possible, typically within seconds or minutes (this may be thought of, in some embodiments, as "near-real-time" functionality). The skilled artisan is familiar with real time updates employing QoS prioritization and the like, and, given the teachings herein, will be able to implement same in the context of one or more embodiments of the invention.

Still referring to FIG. 6, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. The platform may manage various types of account functioning, such as pre-funded and post-paid. Among the tasks that may be managed by platform 704 are:

- routing fare gate transaction activity between the transit agency reader/terminals and the AFM.
- managing the necessary funding options for contactless device customers and their associated accounts, such pre-fund or Pay-As-You-Go (post-paid) accounts. The Post-paid transactions can be processed via either real-time or as aggregated authorizations.
- hosting a transit agency-defined fare table and transfer rules (the fare rules may be defined by the transit agency, often as part of a public process, and the platform 704 typically does not change these rules; rather its function is to apply these rules to riders' accounts in the AAL) and applying these fare and transfer rules to riders' accounts—since fare rules reside here, calculations of complex fares, for example, depending on distance traveled or discounts, may be performed here.
- preparing the information to facilitate clearing messages between transit agencies, their acquirers, and the operator of a payment card network, such as MasterCard International Incorporated.
- receiving and managing the transit agency's Restricted Card List (RCL).
- supporting customer service functionalities such as web site 706 and call center 708 interfaces.

"Well net" 714 is a monitoring and parameter management system for MIPs 1208, 1212.

Appropriate communications links may be provided between the platform 704 and the transit agency 1204 and acquirer 1206.

One or more embodiments of the invention advantageously move complex fare calculations away from the exit gate, so that they do not have to be done in real-time (typically 200-300 ms), and to simplify/centralize the architecture. In such instances, calculation can be done after the event (ideally in 'near real-time') and payment adjustment can be deferred to the next entry tap.

A non-limiting example, based on the Transport for London's (TfL's) "Oyster" card scheme, will now be presented. Initially, a card taps in at a Zone 1 station and is charged £4.00 (the maximum fare, as in the current Oyster model). The card then taps out at another Zone 1 station, and no payment or refund is applied at this time (unlike the current Oyster model whereby the appropriate partial refund of £2.50 would be applied at this point). Thereafter the platform 704 calculates that the fare due was £1.50 (for a Zone 1 to Zone 1 journey) and therefore reduces the adjustment value from zero to £2.50 (that is, negative two and one-half pounds sterling). An updated adjustment value is communicated to AFM 1208. AFM 1208 will supply this number, in addition to the go/no-go (i.e., access control) response the next time the card is tapped In terms of the subsequent presentation, the card taps in at any station and is charged £4.00 adjusted by the value of £2.50, resulting in a payment of £1.50 being taken. At this point (entry and check out for the first ride and entry for the second ride completed), the cumulative fare charged is £5.50 (one completed Zone 1 to Zone 1 journey plus one incomplete journey).

Consider now the case where the cardholder failed to check out (e.g., by tapping out with the card or other device) at the end of the first journey. The card checks in (e.g., by tapping in with the card or other device) at a Zone 1 station and is charged £4.00 (equals maximum fare as in current Oyster model). No check out is reported to platform 704; therefore the adjustment value remains unchanged (=£0.00 in this example). The card then checks in at any station and is charged £4.00 (adjustment value=£0.00). The cumulative fare charged is thus £8.00 (two incomplete journeys). Advantageously, the exemplary approach just described allows TfL to maintain current business and/or fare rules. The skilled artisan, given the teachings herein, will be able to adapt inventive techniques to other transit systems, advantageously, with little or no impact on current rules.

If TfL (or another transit system operator) wishes to ensure that any cardholder who has sufficient balance to cover the minimum fare (in this example £1.50) is able to enter the system, then the adjustment value could default to an initial value of £2.50 so the initial fare charged on entry will be £1.50 (rather than £4.00).

Advantageously, in one or more embodiments, inventive mechanisms are self-correcting since, as platform 704 learns about each new transaction, it will update the adjustment value accordingly to fix any prior under- or over-charging that may have taken place based on previously incomplete information.

In one or more embodiments, the central server that calculates the transaction amount and the variable adjustment is the payment platform 704 in FIG. 6. Payment platform 704 advantageously calculates the adjustment, since this is typically where the fare rules reside. The adjustment is calculated as the cumulative fare due against this card to date less the cumulative payment taken from this card to date (a negative value if the card was over-charged at the first presentation). In some instances, the payment platform 704 does not actively participate in the real time transaction, so the adjustment value can be communicated to the AFM 1208 in order that it can be applied to the fare at the next entry tap.

It should be noted that the preceding description is non-limiting, and the central server could be in other locations in other embodiments. In general, the central server can be anywhere in the system where the cumulative payment received to date is known or can be calculated and the total payment due to date is known or can be calculated. This may include having additional data to hand in order to inform the payment due calculation (e.g., personal entitlements and/or discounts and/or subsidies associated with the card). Under a different architecture, this could be the same system component that participates in the real time transaction (functionality of elements 704, 1208 could be combined in some instances).

By way of summary and provision of further detail, in many cases, a "transaction" using one or more inventive techniques will imply multiple (two or more) presentations of the card or other payment device, such as check-in and check-out, which determine the final fare. However, in some instances, only a single presentation is required, and certain calculations (e.g., fare discount, patient-responsible amount for insurance) may need to be performed to determine the amount due. While the term "rebate" has been employed herein in some instances, the term "adjustment amount" is more general, since the amount may be positive or negative.

It is believed that one or more inventive techniques are most advantageously applied to cards that can be written to, including offline balance cards (chip cards or magnetic stripe cards where the stripe can be written to, so as to hold a balance). It should be noted that the adjustment amount is applied to the predetermined nominal amount for the next transaction, not to the balance on the card. This may be advantageous, for example, in EMV-compliant situations.

As noted, embodiments of the invention can be employed in scenarios other than check-in/check-out transit fare collection. For example, a transit system might only require check-in, but the fare might depend on discounts or other parameters requiring a time-consuming calculation. In such cases, an exemplary method might proceed as follows. A predetermined amount (e.g., maximum fare without discount) could be charged upon presentation of the payment device to the transit system. The final transaction amount (based on the discount) could be calculated at the central server, subsequent to the presentation. The variable adjustment value could be calculated at the central server by comparing the predetermined amount already charged with the final transaction amount. A new predetermined amount charged, upon a subsequent presentation of the payment device, could be modified by the variable adjustment value.

In another example, in an insurance scenario, the patient-responsible balance might depend on a time-consuming adjudication process. In such cases, an exemplary method might proceed as follows. A predetermined amount (e.g., maximum possible patient-responsible amount) could be charged upon presentation of the payment device to the provider. The final transaction amount (based on the adjudication) could be calculated at the central server, subsequent to the presentation. The variable adjustment value could be calculated at the central server by comparing the predetermined amount already charged with the final transaction amount. A new predetermined amount charged, upon a subsequent presentation of the payment device, could be modified by the variable adjustment value.

By way of review, when tapping out at an exit gate (for example), prior art techniques (such as TfL's Oyster card) require a high-speed real time calculation which works out how far the passenger has traveled, what fare rules apply, and how much to charge; then performs the actual charge, and then allows egress through the fare gate. One or more embodiments of the invention, however, defer such fare calculation to, for example, payment platform 704 in FIG. 6. In particular, the card is tapped; the resultant requests passes transparently through the payment platform 704 to the AFM 1208; AFM 1208 signals that the passenger is allowed to exit through the fare gate. Thereafter, the payment platform 704 collects information re the tap history of the card, which is translated to a fare calculation. Advantageously, in one or more embodiments, steps that should happen in real time, when the card or other payment token (device) is tapped or otherwise presented to the terminal, are performed using AFM 1208, while steps that should happen after the event in a "back office" fashion are performed using payment platform 704. Payment platform 704 thus typically "knows" how much a card has paid and should pay, and based on these two facts, will determine how much is owed to or by the card; this information is the shared with AFM 1208 which applies same as a discount or overcharge in real time as the card next checks in.

System and Article of Manufacture Details

Figure 7:
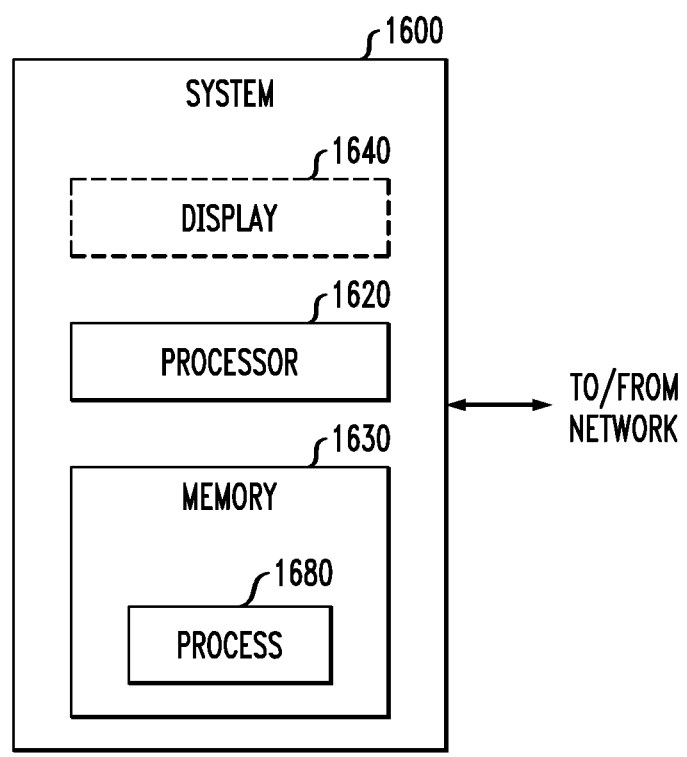
FIG. 7 is a block diagram of an exemplary computer system useful in one or more embodiments of the present invention.

The invention can employ hardware and/or software aspects. Software includes but is not limited to firmware, resident software, microcode, etc. Software might be employed, for example, in connection with one or more of a terminal 122, 124, 125, 126, 702, a front end processor 1208, 1212, an authorization subsystem located at a central location 1216, a processing center 140, 142, 144 (optionally with data warehouse 154) of a merchant, issuer, acquirer, processor, or payment processing network operator, and/or platform 704. Firmware might be employed, for example, in connection with payment devices such as cards 102, 112. FIG. 7 is a block diagram of a system 1600 that can implement part or all of one or more aspects or processes of the present invention. As shown in FIG. 7, memory 1630 configures the processor 1620 (which could correspond, e.g., to processor portions 106, 116, 130, processors of elements 1208, 1212, 702, 704, processors of authorization subsystems such as that located at a central location 1216 or processors of remote hosts in centers 140, 142, 144) to implement one or more aspects of the methods, steps, and functions disclosed herein (collectively, shown as process 1680 in FIG. 7). Different method steps can be performed by different processors. The memory 1630 could be distributed or local and the processor 1620 could be distributed or singular. The memory 1630 could be implemented as an electrical, magnetic or optical memory, or any combination of these or other types of storage devices (including memory portions as described above with respect to cards 102, 112). It should be noted that if distributed processors are employed, each distributed processor that makes up processor 1620 generally contains its own addressable memory space. It should also be noted that some or all of computer system 1600 can be incorporated into an application-specific or general-use integrated circuit. For example, one or more method steps could be implemented in hardware in an ASIC rather than using firmware. Display 1640 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, 1208, 1212, 1216, 702, 704, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor.

With this definition, information on a network is still within a memory because the associated processor can retrieve the information from the network.

Thus, elements of one or more embodiments of the present invention, such as, for example, the aforementioned terminals 122, 124, 125, 126, 702, processing centers 140, 142, 144 with data warehouse 154, processors 1208, 1212, 704, processors of authorization subsystems such as that located at a central location 1216, or payment devices such as cards 102, 112 can make use of computer technology with appropriate instructions to implement method steps described herein. By way of further example, a terminal apparatus 122, 124, 125, 126, 702 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe). By way of yet a further example, an active file manager apparatus for processing an active file in a payment system, could include a memory, and at least one processor coupled to the memory. The processor can be operative to perform one or more method steps described herein, or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1600 as shown in FIG. 7) running a server program. It will be understood that such a physical server may or may not include a display, keyboard, or other input/output components.

Furthermore, it should be noted that any of the methods described herein can include an additional step of providing a system comprising distinct software modules embodied on a tangible computer readable storage medium. All the modules (or any subset thereof) can be on the same medium, or each can be on a different medium, for example. The modules can include any or all of the components shown in the figures. In one or more embodiments, the modules include a reader module, a payment platform module, and an active file manager module. The method steps can then be carried out using the distinct software modules of the system, as described above, executing on one or more hardware processors. Further, a computer program product can include a tangible computer-readable storage medium with code adapted to be executed to carry out one or more method steps described herein, including the provision of the system with the distinct software modules. In a preferred but non-limiting embodiment, payment platform 704 is realized as the payment platform module executing on a central server; and AFM 1208 is realized as the active file manager module executing in association with a front end communication processor (i.e., on such a front end communication processor or on another computer coupled thereto). Steps 304, 310, and 312 can be carried out, for example, by payment platform 704. Step 306 can be carried out, for example, by the reader module executing on a processor associated with a terminal, such as the terminal of fare gate assembly 702. Steps 308 and 314 can be carried out by presenting the card or other payment device to appropriate fare gates for exit and subsequent entrance. Step 316 can be carried out, for example, by AFM 1208.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for payment with a payment device when a final transaction amount is not known upon first presentation of said payment device to a merchant, said method comprising the steps of:

charging a predetermined amount upon said first presentation, using at least one hardware processor;

calculating said final transaction amount, using said at least one hardware processor and subsequent to said first presentation, said calculated final transaction amount being calculated at a central server;

calculating a variable adjustment value using said at least one hardware processor by comparing said predetermined amount already charged with said final transaction amount, said calculated variable adjustment value being calculated at said central server; and modifying a new predetermined amount charged, upon a next presentation of said payment device for a next transaction, by said variable adjustment value, using said at least one hardware processor;

wherein:

said payment device comprises a smart card having a monetary balance stored thereon;

said merchant comprises a transit authority associated with a transit system; and said first presentation comprises entry to said transit system for a journey and said predetermined amount is charged against said monetary balance stored on said smart card;

further comprising the additional step of checking out of said transit system, using said smart card, at an end of said journey;

wherein:

said final transaction amount comprises a distance based transit fare, calculated at said central server, after said checking out, based on said first presentation and said checking out, according to a fare calculation scheme having a maximum fare for a maximum distance traveled and at least one lesser fare for a lesser distance traveled;

said variable adjustment value is calculated at said central server as a difference between said maximum fare and said final transaction amount;

said predetermined amount comprises one of:
said maximum fare; and
said maximum fare less a previous variable adjustment value; and said new predetermined amount charged is charged against said monetary balance stored on said smart card.

2. The method of claim 1, wherein said at least one hardware processor comprises a first processor located on said central server, a second hardware processor, and a third hardware processor, further comprising:

providing a system, wherein said system comprises distinct software modules, each of said distinct software modules being embodied on a non-transitory tangible computer-readable recordable storage medium, and wherein said distinct software modules comprise a reader module, a payment platform module, and an active file manager module;

wherein:

said payment platform module executes on said first processor located on said central server;

said step of charging said predetermined amount upon said first presentation is carried out by said reader module executing upon said second hardware processor, said second hardware processor being associated with a terminal;

said step of calculating said final transaction amount, subsequent to said first presentation, is carried out by said payment platform module executing on said first processor located on said central server;

said step of calculating said variable adjustment value is carried out by said payment platform module executing on said first processor located on said central server; and said step of modifying said new predetermined amount charged, upon said next presentation of said payment device, is carried out by said active file manager module executing in association with said third hardware processor, said third hardware processor being located on a front end communications processor.

3. The method of claim 2, wherein said system further comprises a fare gate assembly, said fare gate assembly comprising said second hardware processor associated with said terminal, further comprising opening said fare gate assembly upon said first presentation.

4. The method of claim 2, wherein said modifying comprises initially charging said predetermined amount, less said variable adjustment value, for said next transaction.

5. The method of claim 2, further comprising the additional step of applying a value of zero to said variable adjustment value in a case where a user of said device fails to check out of said transit system upon exit, wherein said maximum fare is applicable in said case where said user fails to check out, and wherein said applying said value of zero is carried out by said payment platform module executing on said central server.

6. The method of claim 2, further comprising the additional step of initializing said variable adjustment value to said maximum fare less a minimum fare, prior to said first presentation, whereby a user of said device having a balance at least equal to said minimum fare may enter said transit system upon said first presentation of said device, said initializing of said variable adjustment value being carried out by said payment platform module executing on said central server.

7. The method of claim 1, wherein, in said step of modifying said new predetermined amount charged, said next transaction is with said merchant.

8. An apparatus for payment with a payment device when a final transaction amount is not known upon first presentation of said payment device to a merchant, said apparatus comprising:

a memory; and at least one processor, coupled to said memory, and operative to:

facilitate charging a predetermined amount upon said first presentation;

facilitate calculating said final transaction amount subsequent to said first presentation, said calculated final transaction amount being calculated at a central server;

facilitate calculating a variable adjustment value by comparing said predetermined amount already charged with said final transaction amount, said calculated variable adjustment value being calculated at said central server; and facilitate modifying a new predetermined amount charged, upon a next presentation of said payment device for a next transaction, by said variable adjustment value;

wherein:

said at least one processor comprises a processor located on said central server, a first entrance terminal processor coupled to said processor located on said central server, a second entrance terminal processor coupled to said processor located on said central server, and an exit terminal processor coupled to said processor located on said central server;

said apparatus is configured for operation with said payment device, said payment device comprising a smart card having a monetary balance stored thereon;

said merchant comprises a transit authority associated with a transit system; and said first presentation comprises entry to said transit system for a journey and said predetermined amount is charged against said monetary balance stored on said smart card by said first entrance terminal processor;

said exit terminal processor is operative to check a holder of said payment apparatus out of said transit system, using said smart card, at an end of said journey;

wherein:

said final transaction amount comprises a distance based transit fare, calculated by said processor located on said central server, after said checking out, based on said first presentation and said checking out, according to a fare calculation scheme having a maximum fare for a maximum distance traveled and at least one lesser fare for a lesser distance traveled;

said variable adjustment value is calculated by said processor located on said central server as a difference between said maximum fare and said final transaction amount;

said predetermined amount comprises one of:

said maximum fare; and said maximum fare less a previous variable adjustment value; and said new predetermined amount charged is charged against said monetary balance stored on said smart card by said second entrance terminal processor.

9. The apparatus of claim 8, wherein said at least one processor comprises a first processor located on said central server, a second processor, and a third processor, further comprising:

a terminal, said second processor being associated with said terminal;

a front end communications processor, said third processor being associated with said front end communications processor; and distinct software modules, each of said distinct software modules being embodied on a tangible computer-readable recordable storage medium, said distinct software modules comprising a reader module, a payment platform module, and an active file manager module;

wherein:

said second processor is operative to charge said predetermined amount upon said first presentation by executing said reader module;

said first processor is operative to calculate said final transaction amount, subsequent to said first presentation, by executing said payment platform module;

said first processor is operative to calculate said variable adjustment value by executing said payment platform module; and said third processor is operative to modify said new predetermined amount charged, upon said next presentation of said payment device for said next transaction, by executing said active file manager module.

10. The apparatus of claim 9, wherein said apparatus further comprises a fare gate assembly, said fare gate assembly comprising said second processor, said second processor being operative to facilitate opening said fare gate assembly upon said first presentation.

11. The apparatus of claim 9, wherein said third processor is operative to modify said new predetermined amount charged by initially charging said predetermined amount, less said variable adjustment value, for said next transaction.

12. The apparatus of claim 9, wherein said first processor is operative to apply a value of zero to said variable adjustment value in a case where a user of said device fails to check out of said transit system upon exit, wherein said maximum fare is applicable in said case where said user fails to check out, and wherein said applying of said value of zero is carried out by said payment platform module executing on said first processor.

13. The apparatus of claim 9, wherein said first processor is operative to initialize said variable adjustment value to said maximum fare less a minimum fare, prior to said first presentation, whereby a user of said device having a balance at least equal to said minimum fare may enter said transit system upon said first presentation of said device, said initializing of said variable adjustment value being carried out by said payment platform module executing on said first processor.

14. The apparatus of claim 8, wherein said at least one processor is operative to facilitate modifying said new predetermined amount charged, upon said next presentation of said payment device for said next transaction, by said variable adjustment value, with said next transaction being with said merchant.

15. A computer program product for payment with a payment device when a final transaction amount is not known upon first presentation of said payment device to a merchant, said computer program product comprising a non-transitory tangible computer readable storage medium having program instructions embodied therewith, the program instructions being executable by at least one hardware processor to cause said at least one hardware processor to perform a method comprising:

charging a predetermined amount upon said first presentation;

calculating said final transaction amount, subsequent to said first presentation, said calculated final transaction amount being calculated at a central server;

calculating a variable adjustment value by comparing said predetermined amount already charged with said final transaction amount, said calculated variable adjustment value being calculated at said central server; and modifying a new predetermined amount charged, upon a next presentation of said payment device for a next transaction, by said variable adjustment value;

wherein:

said payment device comprises a smart card having a monetary balance stored thereon;

said merchant comprises a transit authority associated with a transit system; and said first presentation comprises entry to said transit system for a journey and said predetermined amount is charged against said monetary balance stored on said smart card;

said method further comprises checking out of said transit system, using said smart card, at an end of said journey;

wherein:

said final transaction amount comprises a distance based transit fare, calculated at said central server, after said checking out, based on said first presentation and said checking out, according to a fare calculation scheme having a maximum fare for a maximum distance traveled and at least one lesser fare for a lesser distance traveled;

said variable adjustment value is calculated at said central server as a difference between said maximum fare and said final transaction amount;

said predetermined amount comprises one of:
said maximum fare; and
said maximum fare less a previous variable adjustment value; and said new predetermined amount charged is charged against said monetary balance stored on said smart card.

16. The computer program product of claim 15, wherein:

the at least one hardware processor on which the program instructions are executable comprises a first hardware processor located on said central server, a second hardware processor, and a third hardware processor;

the program instructions comprise distinct software modules, each of said distinct software modules being embodied on said non-transitory tangible computer readable storage medium, and wherein said distinct software modules comprise a reader module, a payment platform module, and an active file manager module;

wherein:

said payment platform module is configured to execute on said central server;

said reader module comprises said program instructions executable to cause said charging of said predetermined amount upon said first presentation, said reader module being configured to execute upon said second hardware processor, said second hardware processor being associated with a terminal;

said payment platform module comprises said program instructions executable to cause said calculating of said final transaction amount, subsequent to said first presentation, said payment platform module being configured to execute on said first hardware processor located on said central server;

said payment platform module comprises said program instructions executable to cause said calculating of said variable adjustment value, said payment platform module being configured to execute on said first hardware processor located on said central server; and said active file manager module comprises said program instructions executable to cause said modifying of said new predetermined amount charged, upon said next presentation of said payment device for said next transaction, said active file manager module being configured to execute in association with said third hardware processor, said third hardware processor being located on a front end communications processor.

17. The computer program product of claim 15, wherein said program instructions executable to cause said modifying of said new predetermined amount charged comprise program instructions executable to cause said modifying of said new predetermined amount charged, upon said next presentation of said payment device for said next transaction, by said variable adjustment value, with said next transaction being with said merchant.

* * * * *